United States Patent
Dunning et al.

[11] Patent Number: 5,898,692
[45] Date of Patent: Apr. 27, 1999

[54] SCALABLE BANDWIDTH DIGITAL DATA SWITCH

[75] Inventors: David Stewart Dunning; Joel Christopher Dodd, both of Portland, Oreg.

[73] Assignee: Intel Corporation, Santa Clara, Calif.

[21] Appl. No.: 08/738,377

[22] Filed: Oct. 25, 1996

[51] Int. Cl.[6] ............................................. H04Q 1/00
[52] U.S. Cl. ..................... 370/427; 370/355; 370/389; 340/825.8
[58] Field of Search .................. 370/355, 351, 370/389, 361, 369, 376, 380, 392, 393, 473, 474, 357; 379/427, 335; 340/825.79, 825.8

[56] References Cited

U.S. PATENT DOCUMENTS

| 4,695,999 | 9/1987 | Lebizay | 370/387 |
| 4,929,939 | 5/1990 | Varma et al. | 340/427 |

OTHER PUBLICATIONS

"GIGAswitch/ATM Networking Switch," product brochure.
"AX7008 ATM Backbone Switch," product brochure.

*Primary Examiner*—Jeffrey A. Hofsass
*Assistant Examiner*—Rafael A. Perez-Pineiro
*Attorney, Agent, or Firm*—Kenyon & Kenyon

[57] ABSTRACT

A scalable bandwidth switch is formed from a smart data crossbar and a plurality of simple data crossbars in parallel. A data block that is inputted into the switch contains a header portion and a payload portion. The data block is multiplexed so that the entire header portion is inputted to a port in the smart data crossbar. The smart data crossbar determines the destination of the data block from the header portion, and transmits this information on a control line. The payload portion is inputted to the port in the smart data crossbar, and ports in the plurality of simple crossbars depending on the bandwidth desired. The control line is coupled to the simple data crossbars and configures the simple data crossbars using the port destination information generated by the smart data crossbar.

15 Claims, 7 Drawing Sheets

SCALEABLE BANDWIDTH SWITCH

FIG.1
PRIOR ART

FIG.2
PRIOR ART
DISTRIBUTED CONTROL SWITCH

FIG.3
DATA SWITCH
PRIOR ART

FIG. 4
PRIOR ART

SCALEABLE BANDWIDTH SWITCH

FIG.5

SCALEABLE BANDWIDTH SWITCH

SCALABLE BANDWIDTH DIGITAL DATA SWITCH

BACKGROUND OF THE INVENTION

The present invention is directed to a method and apparatus for switching digital data, and, more particularly, to a scalable digital data switch in which the bandwidth of each port of the switch can be varied.

Figure 1:
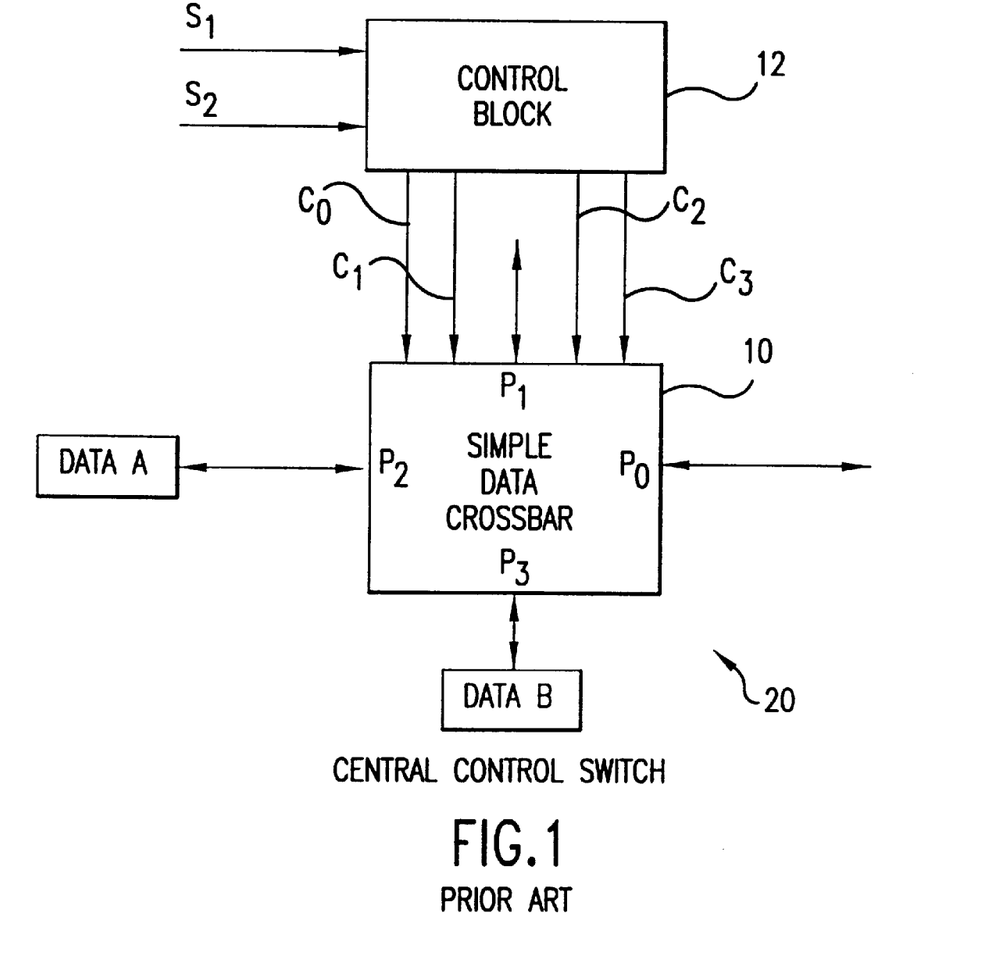
FIG. 1 is a block diagram of a central control switch.

In order to switch digital data, two types of switches are generally used: a central control switch and a distributed control switch. FIG. 1 shows a block diagram example of a central control switch.

The central control switch 20 shown in FIG. 1 includes a simple four-port data crossbar 10. The simple crossbar 10 shown in FIG. 1 includes four bidirectional data ports $P_0$–$P_3$ but alternatively could include eight unidirectional ports (four input ports and four output ports). The simple crossbar 10 can be configured to switch incoming data to output ports. For example, in FIG. 1, Data A is inputted through port $P_2$. The simple crossbar 10 can be configured so that Data A is outputted through any of ports $P_0$–$P_3$. The possible combinations increase exponentially as data is inputted to more ports. For example, in FIG. 1, if Data A is inputted through port $P_2$, and Data B is inputted through port $P_3$, the simple crossbar 10 can be configured to output Data A to port $P_3$ and Data B to port $P_0$, or to output Data A to port $P_1$ and Data B to port $P_2$, etc. The simple crossbar internally connects an input port to an output port using wires or "pipes" (not shown)

The simple crossbar 10 also includes inputs for four control signals $C_0$–$C_3$ that determine the configuration of the switch by mapping the input data to the desired output port. The control signals are supplied by a control block 12. The control block 12 has setup inputs $S_1$ and $S_2$ which are generated by a setup mechanism (not shown) such as a microprocessor. The setup mechanism looks at the desired data route pattern and generates $S_1$ and $S_2$ to configure the simple crossbar 10 accordingly.

The primary advantage of the central control switch 20 is that the throughput or the speed that data moves along the wire or pipe in the simple crossbar 10 is relatively high. Therefore, once a specific data pattern or configuration has been set up by the control block 12, the central control switch 20 is very fast. The disadvantage of the control switch 20 is that setup time is very slow which causes relatively poor latency. Latency is the total elapsed time from when data is inputted to the control switch 20 until it is outputted, and therefore is dependent on both the setup time of the simple crossbar 10 and the throughput. In the central control switch 20, setup time is present whenever the data pattern causes the simple crossbar to be reconfigured. Therefore, if the data pattern is frequently changing, the central control switch 20 provides good throughput, but poor latency.

A central control switch is typically used in the telephone art where each data connection lasts a long time, and therefore the switch's throughput is more critical than the switch's latency. A central control switch is best suited for long streams of data. Once the (relatively long) time penalty has been paid to establish a route through the central control switch, the streams of data flow through without any additional routing decisions.

Examples of the simple data crossbar 10 included in the central control switch 20 include the TQ8015 and TQ8017 switches from Triquint Semiconductor.

Figure 2:
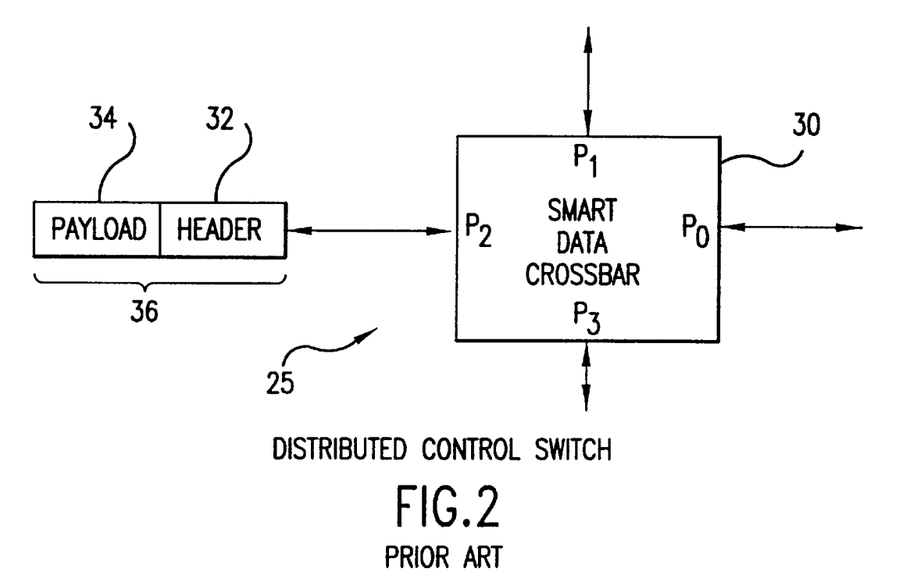
FIG. 2 is a block diagram of a distributed control switch.

FIG. 2 shows a block diagram example of a distributed control switch 25. The distributed control switch 25 consists of a "smart" data crossbar 30. The smart data crossbar 30 shown in FIG. 2, like the simple data crossbar 10, includes four bidirectional data ports $P_0$–$P_3$ which allow input and output of digital data. Alternatively, the smart data crossbar 30 could include eight unidirectional ports (four input ports and four output ports). The smart data crossbar 30 includes intelligence which allows it to configure itself based on the destination of incoming data. Data 36 is typical of the format required of incoming data. Data 36 includes a payload portion 34 and a header portion 32. The header portion 32 provides the smart data crossbar 30 with the destination of the payload portion 34. Each port in the smart data crossbar 30 must have a control section (not shown) associated with it that reads the header portion 32 and routes the payload portion 34 to the appropriate port.

Unlike the central control switch 20 where all switching must be done before data or payload is sent, in the distributed control switch 25 the switching is done dynamically as the data is sent. The advantage of the distributed control switch 25 is that if the data connections are constantly changing, the overall latency is lower than with the central control switch 20 because the switching decision function is distributed throughout the switch, and therefore each localized decision can occur quicker.

A distributed control switch 25, in contrast to a central control switch 20, is ideally suited to meets the needs of a switching network for a multicomputer. A multicomputer (as defined by Gordon Bell in Bell, C. G., *Multis: A New Class of Multiprocessor Computers*, Science 228, pgs. 462–467 (April, 1985)) requires bursts of relatively short duration, high bandwidth data transfer.

Examples of the distributed control switch 25 or smart crossbar 30 include the ASX-200BX from Fore Systems, Inc., the Vivid ATM Workgroup Switch from Newbridge Networks, Inc., and the Cellplex 7000 switch from 3Com Corp.

Figure 3:
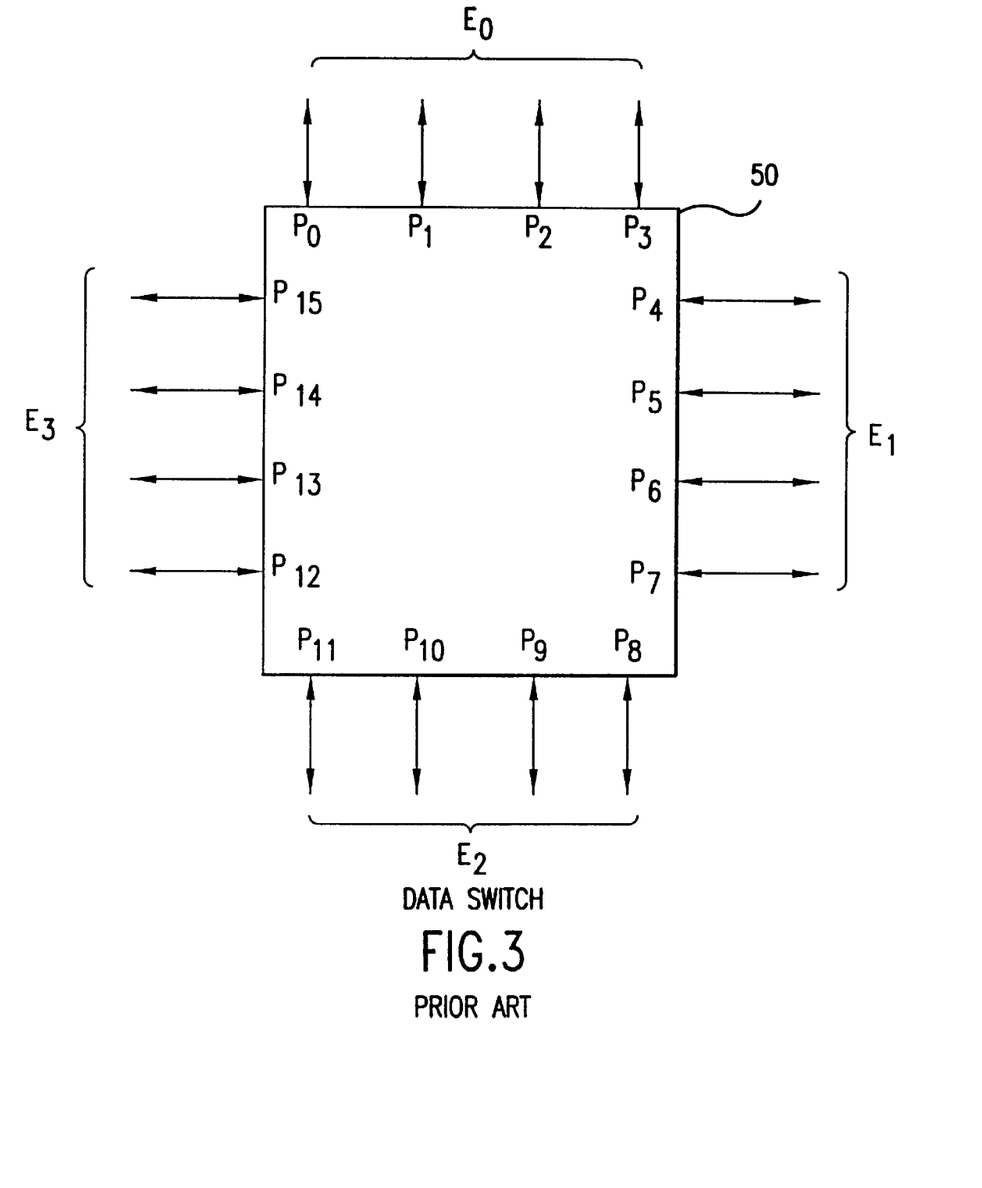
FIG. 3 is a block diagram of a prior art data switch used as a scalable bandwidth data switch.

A scalable bandwidth data switch is a switch in which the number of pipes or connections per port can vary to increase the bandwidth of a particular port. It is known in the art that a scalable bandwidth data switch can be made by combining multiple smart data crossbars 30 and transferring the data in parallel. FIG. 3 shows a block diagram of a data switch 50 that is an example of the type of switch used in the prior art as a scalable bandwidth data switch.

The data switch 50 is made by combining four smart data crossbars 30 shown in FIG. 2 which results in sixteen bidirectional ports $P_0$–$P_{15}$. The data switch 50 optionally can include thirty-two unidirectional ports. Internally, each port $P_0$–$P_{15}$ has a wire or pipe connecting it to every port (not shown). For example, sixteen wires connect port $P_0$ to each of ports $P_0$–$P_{15}$ (each port is bidirectional so it must have a pipe leading to itself). Therefore, data switch 50 contains 16×16, or 4096 internal wires.

The data switch 50 provides variable bandwidth by combining multiple ports into one port. For example, each port $P_0$–$P_{15}$ provides a bandwidth of one "pipe" or connection between ports. If four times the bandwidth is required, ports $P_0$–$P_3$ can be logically combined into one scalable port $E_0$, and ports $P_8$–$P_{11}$ can be logically combined into one scalable port $E_2$. The bandwidth between ports $E_0$ and $E_2$ would then be four "pipes". Data transferred between ports $E_0$ and $E_2$ must be sent in parallel. Therefore, data requiring expanded bandwidth must be multiplexed before being sent to multiple ports simultaneously, and demultiplexed when outputted.

Examples of the prior art data switch 50 shown in FIG. 3 include the GIGAswitch from Digital Equipment Corp. and the AX7008 from IBM Corp.

Figure 4:
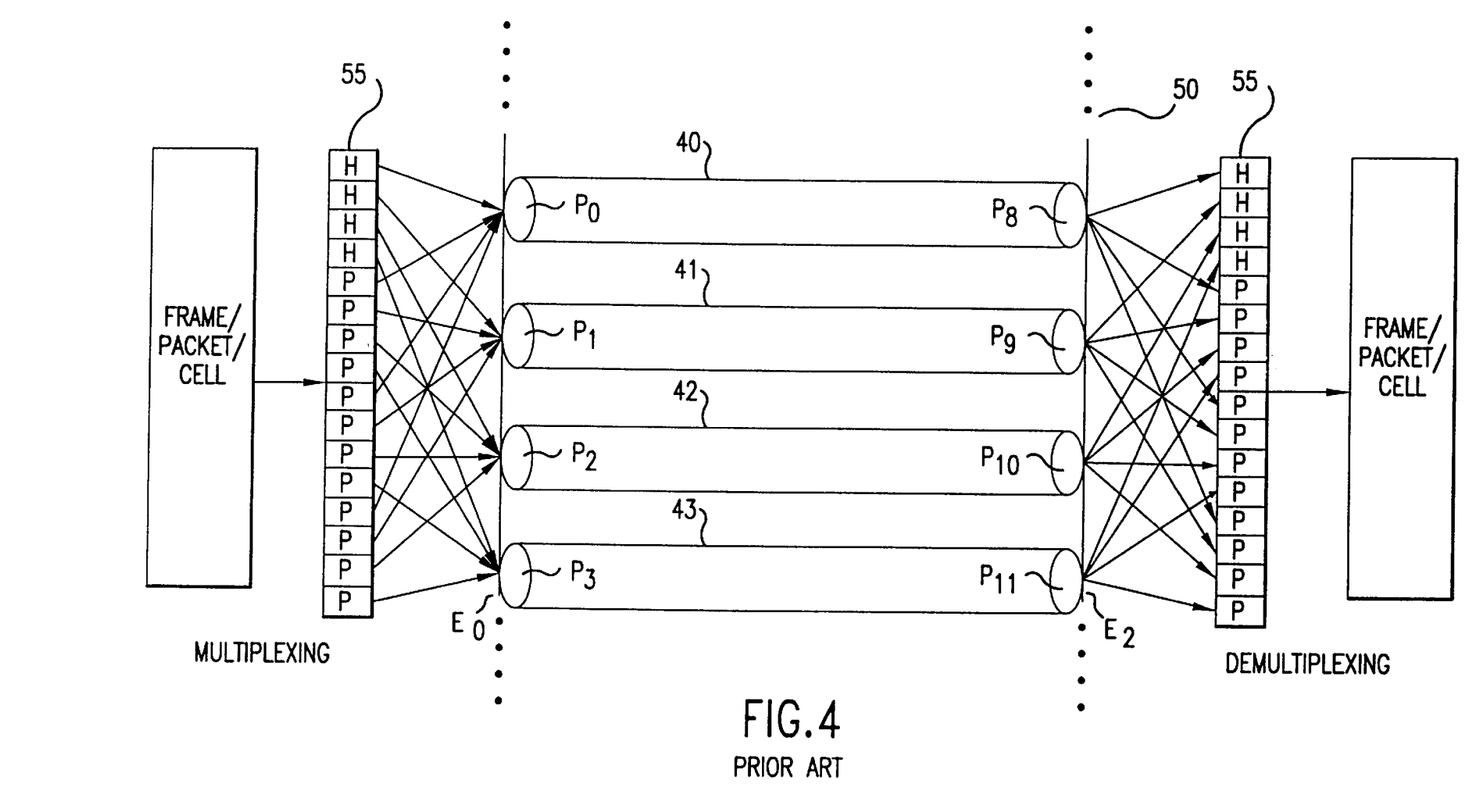
FIG. 4 provides an example of how data is transferred through the data switch of FIG. 3.

FIG. 4 provides an example of the known technique of transferring data 55 between ports $E_0$ and $E_2$ in the data switch 50. Ports $P_0$–$P_3$ comprise port $E_0$ and ports $P_8$–$P_{11}$ comprise port $E_2$. Ports $P_0$–$P_3$ and $P_8$–$P_{11}$ are "smart" ports because they are ports within the smart data crossbar 30 shown in FIG. 2 and therefore have a control section associated with them. Pipes 40–43 provide paths between ports $E_0$ and $E_2$. All data input to ports $P_0$–$P_3$ must include header information that provides the destination of the data. Data 55 is represented as 16 blocks of data, including 4 blocks of header data H and 12 blocks of payload data P. Before data 55 is input into port $E_0$ it must be multiplexed so that a portion of data 55 is sent to each pipe 40–43 in parallel. Each block of data is multiplexed by sending the first block to the first pipe 40, the second block to the second pipe 41, etc. This allows header data H to be sent to each pipe 40–43. The data 55 is then transferred in parallel over pipes 40–43 and demultiplexed when it is output from port $E_2$.

The known method of using the data switch 50 as a scalable data switch is very flexible. It can be configured as, for example, four ports, each port having a bandwidth of four pipes, or sixteen separate ports, each port having a bandwidth of one pipe, etc. However, the data switch 50 is relatively complex and expensive. For example, when configured as 16 separate ports, each port in the data switch 50 requires a separate control system that reads the header of each data and routes the data accordingly. Further, when configured as a four-port switch, data switch 50 must either: a) include a 4:1 multiplexer at each input port and a 1:4 demultiplexer at each output port to disassemble and reconstruct, respectively, the complete header; or b) send the entire header intact across all four pipes of each port, thus reducing the net bandwidth available to pass data.

Further, as the data switch 50 is expanded, the number of wires required expands at an ever increasing rate. For example, the four-port smart crossbar 30 in FIG. 2 requires 4×4, or sixteen wires to connect each port. In contrast, the sixteen-port data switch in FIG. 3, which comprises four-port smart crossbars, requires 16×16, or 4,096 wires to connect each port. Having more wires and more control systems on a switch increases the complexity and increases the size of the switch, which increases the manufacturing cost of the switch Based on the foregoing, there is a need for a scalable bandwidth switch that is less complex and therefore less expensive, easier to manufacture and smaller than the prior art scalable bandwidth switches.

SUMMARY OF THE INVENTION

These and other needs are satisfied by the method and apparatus of the present invention. The present invention is a scalable bandwidth digital data switch formed from a smart data crossbar and a plurality of simple data crossbars in parallel. A data block that is inputted into the switch contains a header portion and a payload portion. The data block is multiplexed so that the entire header portion is inputted to a port in the smart data crossbar. The smart data crossbar determines the destination of the data block from the header portion, and transmits this information on a control line. The payload portion is inputted to the port in the smart data crossbar, and ports in the plurality of simple data crossbars depending on the bandwidth desired. The control line is coupled to the simple data crossbars and configures the simple data crossbars using the port destination information generated by the smart data crossbar.

DETAILED DESCRIPTION

Figure 5:
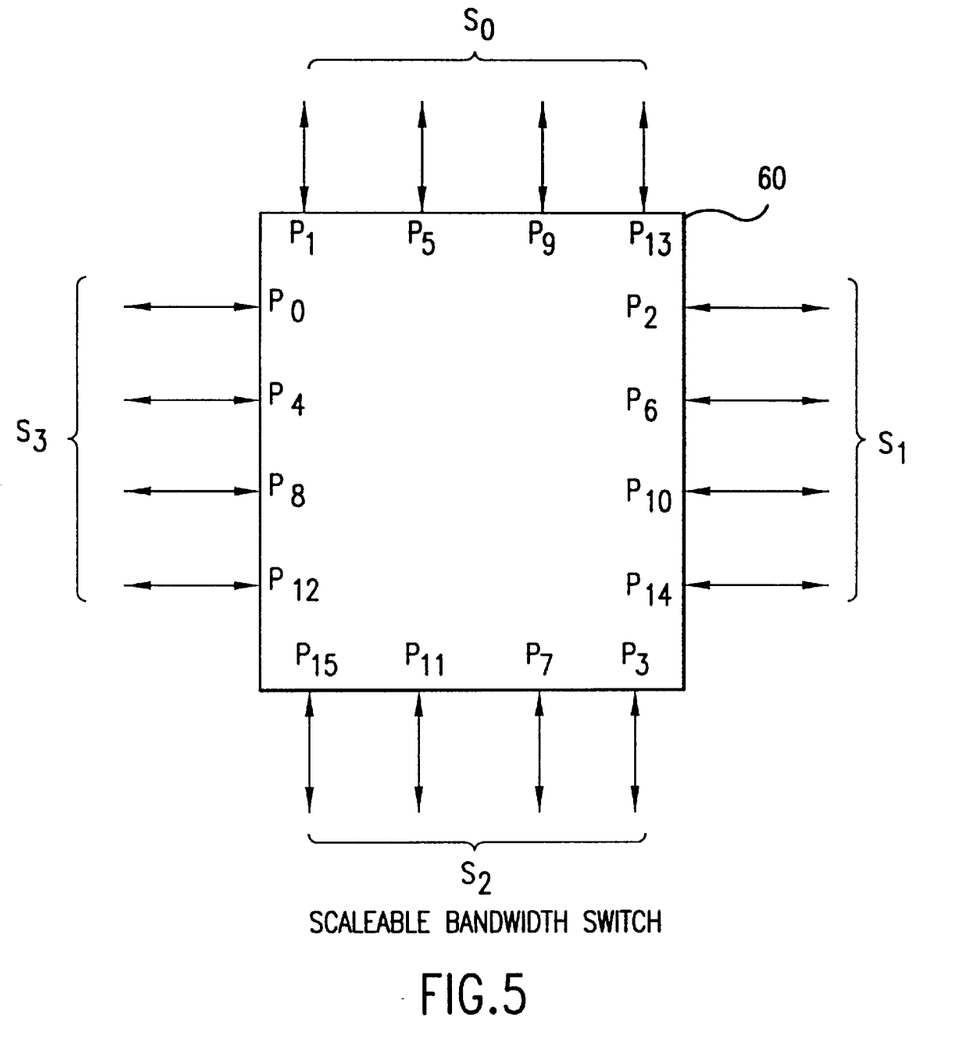
FIG. 5 is a block diagram of the scalable bandwidth data switch of the present invention.

FIG. 5 provides a block diagram overview of the scalable bandwidth switch of the present invention. The scalable bandwidth switch 60 includes four scalable ports $S_0$–$S_3$. Each scalable port $S_0$–$S_3$ comprises four non-scalable ports, for a total of sixteen non-scalable ports $P_0$–$P_{15}$. Each scalable port $S_0$–$S_3$ is scalable from one to four pipes of bandwidth.

Figure 6:
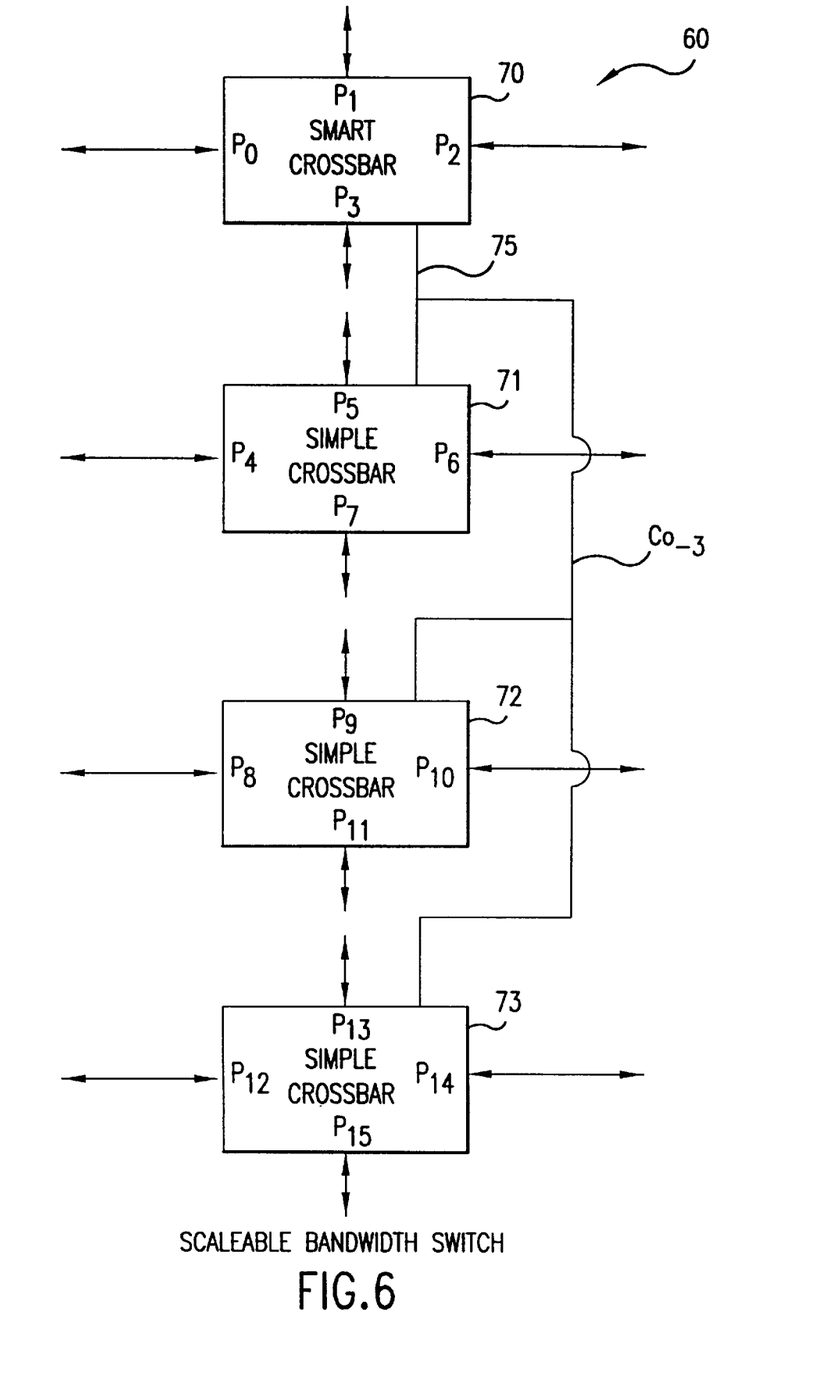
FIG. 6 is an expanded block diagram of the scalable bandwidth data switch of FIG. 5.

FIG. 6 provides an expanded block diagram of the scalable bandwidth switch 60. The scalable bandwidth switch 60 includes a smart crossbar 70. The smart crossbar 70 includes four ports $P_0$–$P_3$ and is identical to the smart data crossbar 30 shown in FIG. 2, except the smart crossbar 70 includes a C output coupled to a control line 75. The control line 75 can comprise multiple sub-control lines, each transmitting a control signal. The output on control line 75 is generated by the control sections (not shown) associated with each port $P_0$–$P_3$ of the smart crossbar 70. The control sections generate the output for control line 75 from the header information of incoming data. Therefore, all of the header information from incoming data must be inputted to smart crossbar 70.

Coupled to the smart crossbar 70 are three simple crossbars 71–73. The simple crossbars 71–73 are identical to simple data crossbar 10 shown in FIG. 1. Control line 75 provides the control signals $C_0$–$C_3$ for each simple crossbar 71–73.

As shown in FIG. 5, each scalable port $S_0S_3$ includes one port from the smart crossbar 70, and three ports from each simple crossbar 71–73. For example, scalable port $S_0$ comprises port $P_1$ from smart crossbar 70, and ports $P_5$, $P_9$ and $P_{13}$ from simple crossbars 71–73 respectfully.

Figure 7:
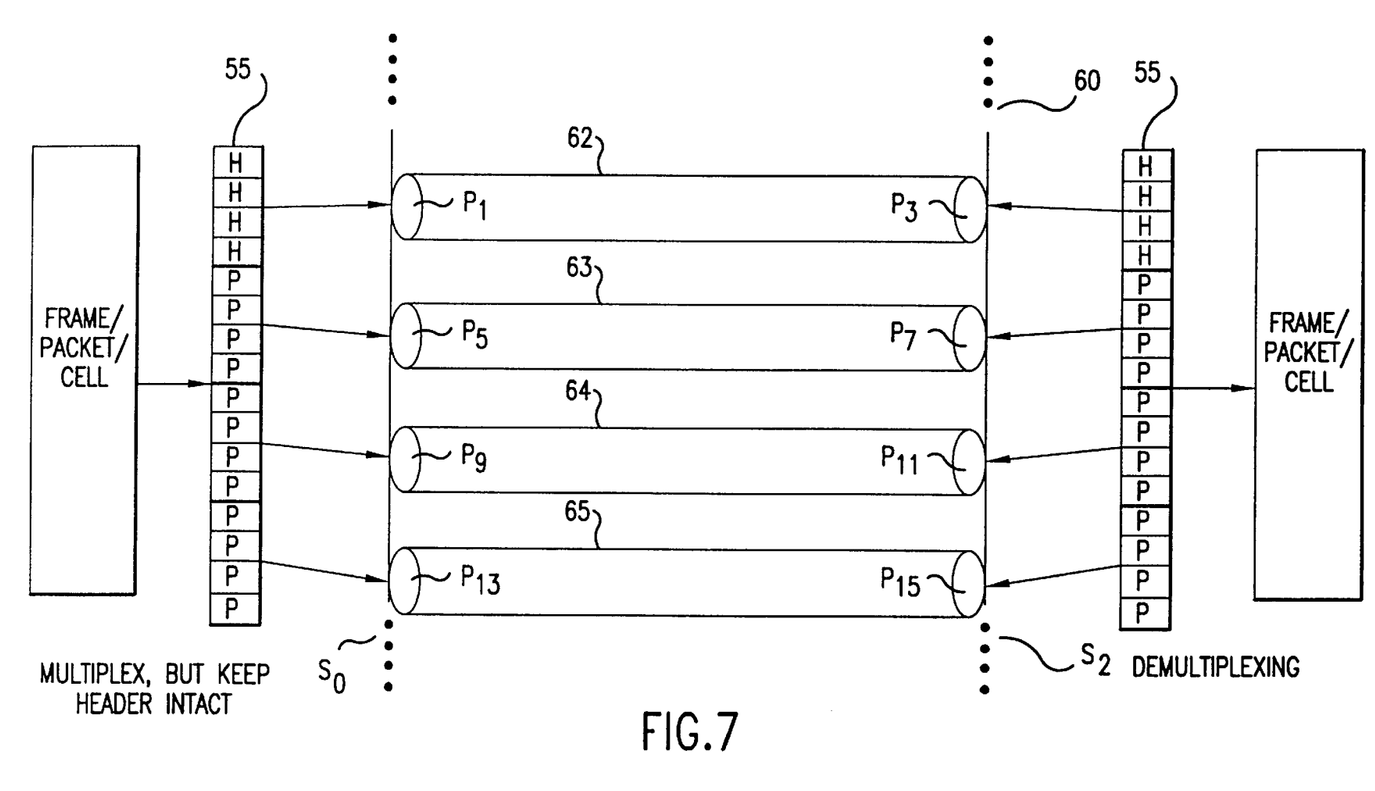
FIG. 7 provides an example of how data is transferred through the data switch of FIG. 5.

FIG. 7 provides an example of how data 55 is transferred between scalable ports $S_0$ and $S_2$ in the scalable bandwidth switch 60. The data 55 is multiplexed before entering port $S_0$ so that all header blocks H are sent to port $P_1$ which is a "smart" port because it is a port within the smart crossbar 70. The port $P_1$ has a control section associated with it that determines the destination of the data 55 based on the header blocks H. The control section also generates the output on control line 75 (shown in FIG. 6) which is a duplicate of the switch programming information already determined. The remaining payload blocks are sent to ports $P_5$, $P_9$ and $P_{13}$, respectively, which are ports of simple crossbars 71–73 (FIG. 6). Because these are simple crossbar ports, they do not have an associated control section and have no use for header information. They are configured based on the information from control line 75. The data is sent through pipes 62–65 and outputted through scalable port $S_2$. The scalable ports $S_0$ and $S_2$ in FIG. 7 have a bandwidth of four pipes.

In the example shown in FIG. 7, four blocks of header information is sent to the smart port $P_1$, and four blocks of payload information is sent to the remaining ports. However, both payload and header information can be sent to smart port $P_1$. For example, if data 55 contained two blocks of header information and fourteen blocks of payload, two blocks of header information and two blocks of payload information can be sent to smart port $P_1$. The only requirement is that all of the header information must be sent to the smart port $P_1$ through the smart crossbar 70 because the smart crossbar 70 determines where the data should be sent and communicates this information to the simple crossbars 71–73 via the control line 75.

The scalable bandwidth switch 60 can only be utilized as a four-port switch, with each port scalable from one to four pipes. This is because each scalable port must include at least one non-scalable smart crossbar port $P_0$–$P_3$. In contrast, the prior art data switch 50 shown in FIG. 3 has more flexibility because it can be utilized as anywhere from a one-port switch scalable to sixteen pipes, to a sixteen-port switch, each port having a bandwidth of one pipe. However, the scalable bandwidth switch 60 provides various advantages over the prior art data switch 50. For example, the scalable bandwidth switch 60 is simpler and less expensive because it does not require an intraswitch connection between every port. Further, the scalable bandwidth switch 60 is less expensive because it uses one expensive smart crossbar, and a plurality of inexpensive simple crossbars, whereas the data switch 50 uses a plurality of expensive smart crossbars.

In addition, the scalable bandwidth switch 60 provides better performance than the data switch 50 in the form of lower latency and/or better congestion characteristics. Specifically, the scalable bandwidth switch 60 provides lower latency (time) because when data enters a port of switch 60, one out of four ports must be chosen as the output port. This takes less time than choosing one out of sixteen ports as the output port, which must be done with the data switch 50.

Further, the scalable bandwidth switch 60 provides better congestion characteristics. Congestion in switches that allow links or busses to be shared (virtually all switches allow this) occurs when two data packets require a resource (wires or buffer storage) at the same time. Allowing the number of wires (bandwidth) to scale reduces congestion due to wire sharing. Adding more buffer storage for packets to wait for a shared resource also reduces congestion—it evens out "hot spots." Because the scalable bandwidth switch 60 is simpler than the data switch 50, it is possible to add more storage buffers to reduce bottlenecks caused by congestion.

The scalable bandwidth switch 60 has been described as having four scalable ports $S_0$–$S_3$. However, any number of ports are permissible as long as the scalable switch includes at least one smart crossbar controlling at least one simple crossbar, and all header information of incoming data is inputted to a port emanating from a smart crossbar. Likewise, the number of smart crossbars and simple crossbars used to implement the scalable bandwidth data switch is also flexible, as well as the number of ports in each crossbar.

While the present invention has been particularly described with reference to FIGS. 1–7, it should be understood that these figures are for illustration only and should not be taken as limitations upon the invention. Other arrangements and methods may be implemented by those skilled in the art without departing from the spirit and scope of the present invention as disclosed herein.

What is claimed is:

1. A scalable bandwidth digital switch comprising:

a plurality of scalable ports adapted to input and output a data packet, wherein the data packet comprises a header portion and a payload portion;

a smart crossbar coupled to said ports, wherein said smart crossbar receives the header portion and provides a control output indicative of an output destination for the data packet; and at least one simple crossbar coupled to said ports and receiving said destination control output of said smart crossbar as an input, wherein said simple crossbar receives at least a first part of the payload portion.

2. The scalable digital switch of claim 1, wherein said control lines configure said at least one simple crossbar.

3. The scalable digital switch of claim 2, wherein said smart crossbar uses said header portion to provide said control output.

4. The scalable digital switch of claim 3, wherein the data packet is multiplexed before being input to said scalable ports.

5. The scalable digital switch of claim 4, wherein a second part of the payload portion is input to said smart crossbar.

6. A scalable bandwidth digital data port for switching a data packet comprising a header portion and a data portion, said data port comprising:

a smart crossbar port that receives the header portion and provides a control output indicative of an output destination for the data packet;

a plurality of simple crossbar ports that receive at least a first part of the payload portion; and a control line coupled to said smart crossbar port and to said plurality of simple crossbar ports, wherein said control line transmits said control output to said plurality of simple crossbar ports.

7. The scalable port of claim 6, wherein said control output provides information to configure said plurality of simple crossbar ports.

8. The scalable port of claim 7, wherein said smart crossbar port comprises a control section that determines the destination of the data packet.

9. The scalable port of claim 8, wherein the bandwidth is varied by varying the number of said plurality of simple crossbar ports.

10. The scalable port of claim 8, wherein said smart crossbar port receives a second part of the payload portion.

11. A method of switching data to provide a scalable bandwidth comprising the steps of:

multiplexing a data packet that comprises a header portion and a payload portion;

inputting the header portion to a smart crossbar port;

inputting at least a first part of the payload portion to a simple crossbar port; and generating a destination of the data packet at said smart crossbar port and transmitting the destination to said simple crossbar port.

12. The method of claim 11, further comprising the step of inputting a second part of the payload portion to the smart crossbar port.

13. The method of claim 11, wherein said at least first part is the payload portion.

14. A scalable bandwidth data switch comprising:

port means for inputting a data packet which includes a header portion and payload portion;

smart means coupled to said port means for receiving and decoding said header portion and for switching a first part of said payload portion;

a plurality of simple means coupled to said port means for receiving and switching a second part of said payload portion; and means coupled to said smart means for configuring said plurality of simple means based on said decoded header portion.

15. The scalable bandwidth data switch of claim 14, further comprising:

means for scaling the bandwidth of the switch.

* * * * *

UNITED STATES PATENT AND TRADEMARK OFFICE
CERTIFICATE OF CORRECTION

PATENT NO. : 5,898,692

DATED : April 27, 1999

INVENTOR(S) : DAVID S. DUNNING et al.

It is certified that error appears in the above-identified patent and that said Letters Patent is hereby corrected as shown below:

| | |
|---|---|
| Column 1, line 29 | "(not shown)" should be --(not shown).-- |
| Column 2, line 22 | "to meets" should be --to meet-- |
| Column 3, line 38 | "switch" should be --switch.-- |
| Column 4, line 34 | "$S_0S_3$" should be --$S_0$-$S_3$-- |
| Column 4, line 38 | "respectfully." should be --respectively.-- |
| Column 4, line 57 | "is sent" should be --are sent-- |

Signed and Sealed this

Twenty-first Day of March, 2000

Attest:

Q. TODD DICKINSON

Attesting Officer

Commissioner of Patents and Trademarks